US010714950B2

(12) United States Patent
Zhang et al.

(10) Patent No.: US 10,714,950 B2
(45) Date of Patent: Jul. 14, 2020

(54) CHARGING CONTROL METHOD AND CHARGING DEVICE

(71) Applicant: GUANGDONG OPPO MOBILE TELECOMMUNICATIONS CORP., LTD., Dongguan, Guangdong (CN)

(72) Inventors: Jialiang Zhang, Guangdong (CN); Kewei Wu, Guangdong (CN); Jun Zhang, Guangdong (CN); Liangcai Peng, Guangdong (CN); Fuchun Liao, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/136,545

(22) Filed: Sep. 20, 2018

(65) Prior Publication Data

US 2019/0020205 A1   Jan. 17, 2019

Related U.S. Application Data

(63) Continuation of application No. 15/114,961, filed as application No. PCT/CN2014/077547 on May 15, 2014, now Pat. No. 10,110,028.

(30) Foreign Application Priority Data

Jan. 28, 2014 (CN) .......................... 2014 1 0043064

(51) Int. Cl.
*H02J 7/00* (2006.01)
*H01M 10/42* (2006.01)

(52) U.S. Cl.
CPC .............. *H02J 7/0029* (2013.01); *H02J 7/00* (2013.01); *H02J 7/007* (2013.01); *H02J 7/0031* (2013.01);

(Continued)

(58) Field of Classification Search
CPC ...... H02J 7/0029; H02J 7/0031; H02J 7/0045; H02J 7/007
See application file for complete search history.

(56) References Cited

U.S. PATENT DOCUMENTS 5,656,917 A * 8/1997 Theobald .............. H01M 10/44
320/106
6,222,347 B1 * 4/2001 Gong ...................... G06F 1/263
320/134

(Continued)

FOREIGN PATENT DOCUMENTS

| CN | 101414753 A | 4/2009 |
| CN | 102946130 A | 2/2013 |

(Continued)

OTHER PUBLICATIONS

Korean Patent Application No. 10-2016-7023629 English translation of Office Action dated Jan. 25, 2019, 7 pages.

(Continued)

*Primary Examiner* — Richard Isla
*Assistant Examiner* — Johali A Torres Ruiz
(74) *Attorney, Agent, or Firm* — Lathrop GPM LLP

(57) ABSTRACT

A quick-charging control method and system are suitable for mobile terminals. The method includes: a first controller obtaining a voltage value of a cell, and sending the voltage value to a second controller; the second controller searching a threshold segment table to find a current regulation instruction matched with a threshold segment containing the voltage value of the cell, and sending the current regulation instruction to a regulation circuit; the regulation circuit performing a current regulation according the current regulation instruction, and outputting a power signal; the second controller sending a second switch-off instruction to the first controller and a second switch circuit respectively if second abnormal charging information is detected; and the second (Continued)

switch circuit, controlling the charging adapter to stop sending the power signal after the current regulation if the second switch circuit receives the second switch-off instruction.

16 Claims, 6 Drawing Sheets

(52) U.S. Cl.
CPC .......... *H02J 7/0034* (2013.01); *H02J 7/0045* (2013.01); *H01M 10/4257* (2013.01)

(56) References Cited

U.S. PATENT DOCUMENTS

| | | | | |
|---|---|---|---|---|
| 10,110,028 | B2* | 10/2018 | Zhang | H02J 7/0031 |
| 2003/0054703 | A1* | 3/2003 | Fischer | H02J 7/0027 |
| | | | | 439/894 |
| 2003/0057922 | A1* | 3/2003 | Odaohhara | H02J 7/0047 |
| | | | | 320/164 |
| 2006/0284595 | A1 | 12/2006 | Hsieh et al. | |
| 2007/0216356 | A1 | 9/2007 | Kamatani et al. | |
| 2011/0089888 | A1* | 4/2011 | Kuo | H02J 7/0065 |
| | | | | 320/103 |
| 2011/0241621 | A1* | 10/2011 | Inoue | H02J 7/0045 |
| | | | | 320/113 |
| 2011/0241921 | A1* | 10/2011 | Wu | G08C 23/04 |
| | | | | 341/176 |
| 2011/0248670 | A1* | 10/2011 | Yamazaki | H01M 2/0212 |
| | | | | 320/107 |
| 2012/0119694 | A1 | 5/2012 | Carpenter | |
| 2014/0152243 | A1 | 6/2014 | Xu et al. | |

FOREIGN PATENT DOCUMENTS

| | | |
|---|---|---|
| CN | 103199595 A | 7/2013 |
| CN | 103236568 A | 8/2013 |
| CN | 203205908 U | 9/2013 |
| EP | 0731549 A2 | 9/1996 |
| EP | 0964497 A2 | 12/1999 |
| EP | 2660945 A1 | 11/2013 |
| GB | 2308246 A | 6/1997 |
| JP | H07308031 A | 11/1995 |
| JP | H08191544 A | 7/1996 |
| JP | 2002315215 A | 10/2002 |
| JP | 2008061343 A | 3/2008 |
| JP | 2009106010 A | 5/2009 |
| JP | 2010040499 A | 2/2010 |
| JP | 2010081757 A | 4/2010 |
| JP | 2010251104 A | 11/2010 |
| JP | 2012228034 A | 11/2012 |
| JP | 2013135510 A | 7/2013 |
| WO | WO 2009119271 A1 | 10/2009 |

OTHER PUBLICATIONS

Korean Patent Application No. 10-2016-7023629 Office Action dated Jan. 25, 2019, 7 pages.
European Patent Application No. 18195263.1 extended Search and Opinion dated Dec. 21, 2018, 10 pages.
Indian Patent Application No. 201637028332 Office Action dated Mar. 14, 2019, 9 pages.
Malaysian Patent Application No. PI 2016702709 Office Action dated Jul. 25, 2019, 4 pages.

* cited by examiner

CHARGING CONTROL METHOD AND CHARGING DEVICE

CROSS-REFERENCE TO RELATED APPLICATIONS

This is a continuation application of U.S. application Ser. No. 15/114,961 based on International Application No. PCT/CN2014/077547, filed on May 15, 2014, which is based on and claims priority to Chinese Patent Application No. 201410043064.X, filed on Jan. 28, 2014, the entire contents of which are incorporated herein by reference.

TECHNICAL FIELD

The present disclosure relates to the mobile terminal field, and more particularly, to a quick-charging control method and system.

BACKGROUND

With the time goes on, the Internet and mobile communication networks provide a large number of function applications. A user cannot only use the mobile terminal to perform a conventional application, such as answering the phone or making a call, but can also use the mobile terminal to browse webpages, transmit pictures and play games, etc.

With the increasing use of the mobile terminal, the mobile terminal requires frequent charging. In addition, according to charging requirements of users, some terminals can accept high-current charging without monitoring the charging current (for example, the charging current is 2 A). Moreover, many charging adapters are developed, via which the high-current charging can be performed constantly. Although the charging time is reduced to some extent, the high charging current can cause some safety risks, for example, a damage to the cell and the charging circuit in the mobile terminal, or even a fire, if the charging adapter is not disconnected in time when the cell is fully charged. Thus, there is a need to control the whole charging process of the cell.

SUMMARY

Embodiments of the present disclosure are to provide a quick-charging control method and a quick-charging control system, so as to avoid problems in the related art that the cell and the charging circuit is easily damaged, if there is no charging control when the charging adapter charges the cell of the mobile terminal using a constant, single and high charging current.

In at least one embodiment, a quick-charging control method is provided to be applied to a charging system including a charging adapter and a mobile terminal. The quick-charging control method includes:

with a first controller, obtaining a voltage value of a cell via a cell connector, and sending the voltage value of the cell to a second controller, in which the mobile terminal includes the first controller, the cell connector and the cell, the charging adapter includes the second controller;

with the second controller, searching a threshold segment table to find a current regulation instruction matched with a threshold segment containing the voltage value of the cell, and sending the current regulation instruction to a regulation circuit, in which the charging adapter includes the regulation circuit, and the threshold segment table records one or more threshold segments and current regulation instructions having a mapping relation with the threshold segments;

with the regulation circuit, performing a current regulation according to the current regulation instruction, and outputting a power signal after the current regulation, such that the charging adapter outputs the power signal after the current regulation;

with the second controller, sending a second switch-off instruction to the first controller and a second switch circuit respectively if second abnormal charging information is detected, in which the charging adapter includes the second switch circuit; and with the second switch circuit, controlling the charging adapter to stop sending the power signal after the current regulation if the second switch circuit receives the second switch-off instruction.

In at least one embodiment, a quick-charging control system is provide to include a charging adapter including a second controller, a regulation circuit and a second switch circuit and a mobile terminal including a cell connector, a first controller and a cell;

the first controller is configured to obtain a voltage value of the cell via the cell connector, and to send the voltage value of the cell to the second controller;

the second controller is configured to search a threshold segment table to find a current regulation instruction matched with a threshold segment containing the voltage value of the cell, to send the current regulation instruction to the regulation circuit, and to send a second switch-off instruction to the first controller and the second switch circuit respectively if second abnormal charging information is detected;

the regulation circuit is configured to perform a current regulation according to the current regulation instruction, to output a power signal after the current regulation, such that the charging adapter outputs the power signal after the current regulation; and the second switch circuit is configured to control the charging adapter to stop sending the power signal after the current regulation if the second switch-off instruction is received.

Some embodiments of the present disclosure at least have the following benefits. The second controller in the charging adapter obtains the voltage value of the cell in mobile terminal in real time, and determines whether there is a need to regulate the current value of the power signal outputted from the charging adapter (the power signal outputted from the regulation circuit after the current regulation) according to the threshold segment table and the voltage value of the cell. Moreover, during the charging process, if the second controller detects the second abnormal charging information, the second switch circuit is switched off timely, such that the charging adapter stops charging the cell of the mobile terminal. Thus, the charging current flowing into the cell can be adjusted in time so as to avoid over-charging the cell, and the charging adapter can be prevented from charging the cell of the mobile terminal if an abnormal charging occurs, such that the charging circuit in the mobile terminal and the charging circuit in the charging adapter can be protected effectively.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments

DETAILED DESCRIPTION

To make the objectives, the technical solutions, and the advantages of embodiments of the present disclosure clearer, the technical solutions in embodiments of the present disclosure are hereinafter described clearly and completely with reference to the accompanying drawings in embodiments of the present disclosure. It should be understood that, specific embodiments described herein are merely used to explain the present disclosure, but not used to limit the present disclosure. In order to illustrate the technical solutions of the present disclosure, specific embodiments are described in the following.

In embodiments of the present disclosure, "first" in "first charging interface", "first power wire", "first switch circuit", "first ground wire" and "first controller" is used for reference, and "second" in "second charging interface", "second switch circuit", "second power wire", "second ground wire" and "second controller" is also used for reference.

In at least one embodiment, the charging adapter in the present disclosure includes a power adapter, a charger, a terminal such as an IPAD and a smart phone which can output a power signal for charge a cell (a cell of a mobile terminal), or the like.

In an embodiment of the present disclosure, a second controller is added in the charging adapter, and a first controller is added in the mobile terminal. When the charging adapter charges the cell of the mobile terminal, the first controller communicates with the second controller, such that a quick-charging coordination is performed with respect to whether the charging adapter is needed (for example, the second controller asks the first controller whether there is a need to quick-charge the cell of the mobile terminal), and the charging current is regulated during the whole charging process, thus avoiding overcharging the cell effectively and ensuring a safe quick-charging.

Figure 1:
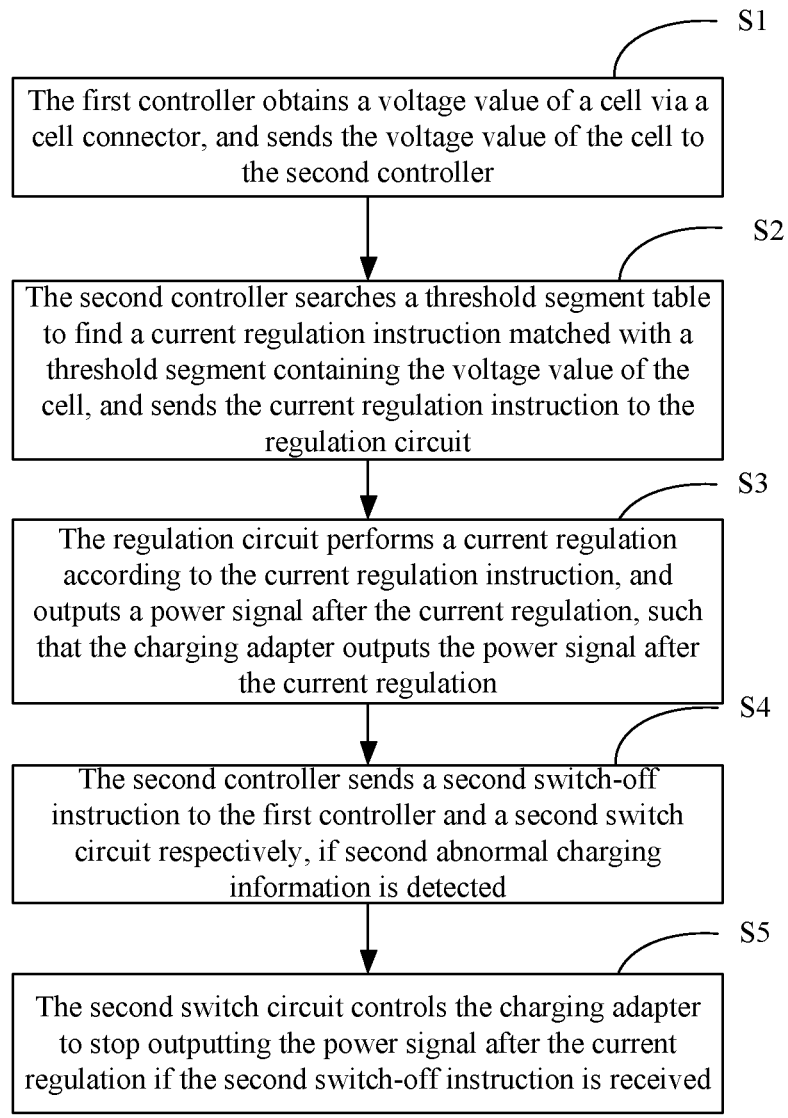
FIG. 1 is a first flow chart of a quick-charging control method according to an embodiment of the present disclosure.

FIG. 1 illustrates a first flow chart of a quick-charging control method according to an embodiment of the present disclosure. For illustration purposes, only the parts related to embodiments of the present disclosure are shown, which will be described in detail as follows.

The quick-charging control method provided by embodiments of the present disclosure is applied to a charging system including the charging adapter and the mobile terminal, and includes the following.

In step S1, the first controller obtains a voltage value of the cell via a cell connector, and sends the voltage value of the cell obtained to the second controller, in which the mobile terminal includes the first controller, the cell connector and the cell, and the charging adapter includes the second controller.

In step S2, the second controller searches a threshold segment table to find a current regulation instruction matched with a threshold segment containing the voltage value of the cell, and sends the current regulation instruction to the regulation circuit, in which the charging adapter includes the regulation circuit, and the threshold segment table records one or more threshold segments and current regulation instructions have a mapping relation with the threshold segments.

In step S3, the regulation circuit performs a current regulation according to the current regulation instruction, and outputs a power signal after the current regulation, such that the charging adapter outputs the power signal after the current regulation.

In step S4, the second controller sends a second switch-off instruction to the first controller and a second switch circuit respectively if second abnormal charging information is detected, in which the charging adapter includes the second switch circuit.

In step S5, the second switch circuit controls the charging adapter to stop outputting the power signal after the current regulation if the second switch circuit receives the second switch-off instruction.

In general cases, electronic components capable of supporting high current (charging current larger than or equal to 3 A) and/or charging circuits (including the charging circuit in the charging adapter (for example, a rectifier and filter circuit and a voltage and current regulation circuit) and the charging circuit in the mobile terminal) capable of supporting high current can be used to realize high-current charging for the cell. However, if the cell of the mobile terminal is charged with a constant high-current, additional impedances such as an internal resistance, a parasitic resistance and a coupling resistance can be introduced into the charging loop (including the charging circuit in the mobile terminal and the charging circuit in the charging adapter), and thus a larger heat dissipation (i.e., more heat energy) can be generated.

Thus, in embodiments of the present disclosure, in order to reduce the charging time, to reduce the heat dissipation, and to perform an overcharge protection on the cell, the second controller regulates the current value of the power signal outputted from the regulation circuit according to the threshold segment table and the voltage value of the cell received in real time when the first charging interface of the mobile terminal is coupled to the second charging interface of the charging adapter, so as to regulate the current value of the power signal flowing into the cell. Thus, through steps S1, S2 and S3, the charging adapter can perform a high-current charging on the cell of the mobile terminal with adjustable charging current.

In at least one embodiment, the threshold segment table is stored in the second controller, and the threshold segment table can be preset according to control requirements on the charging time and the charging current of charging the cell. The threshold segment table records one or more threshold segments, and for each threshold segment (a numerical interval), there is a voltage upper limit and a voltage lower limit. Moreover, the threshold segment table records one or more current regulation instructions, each of which has one corresponding threshold segment. In at least one embodiment, the voltage threshold segment consisting of all the threshold segments in the threshold segment table is continuous on the numerical. In this way, for each voltage value (the voltage value of the cell) detected, a corresponding current regulation instruction can be found.

Further, if the voltage value of the cell received subsequently jumps to another threshold segment from one threshold segment, the second controller will send a current regulation instruction matched with the other threshold segment to the regulation circuit.

When receiving the current regulation instruction, the regulation circuit outputs the power signal after the current regulation, in which the current value of the power signal outputted from the regulation circuit is equal to the current value specified by the current regulation instruction. Thus, the charging adapter sends the power signal outputted from the regulation circuit to the mobile terminal.

In at least one embodiment, if the second controller identifies second abnormal charging information according to data received, during a process in which the charging adapter charges the cell of the mobile terminal, the second controller sends a second switch-off instruction to the second switch circuit, such that via the second switch circuit, sending the power signal (the power signal is outputted by the regulation circuit) to the mobile terminal is stopped timely. In at least one embodiment, the second abnormal charging information includes abnormal information such as information indicating an abnormal temperature of the charging adapter, information indicating that the charging adapter has been pulled out, and information indicating that the current or voltage value of the power signal outputted by the charging adapter is too high. Further, once the second abnormal charging information is detected, the second switch circuit is switched off timely, so as to prevent the charging adapter from sending the power signal to the mobile terminal.

In addition, when the second abnormal charging information is detected, the second controller also sends the second switch-off instruction to the first controller in addition to the second switch circuit, so as to notify the mobile terminal of a need to switch off the charging. Further, the first controller of the mobile terminal can execute corresponding operations according to the second switch-off instruction received. For example, when receiving the second switch-off instruction, the first controller also controls the first switch circuit to switch off, so as to switch off the charging to the cell via the first switch circuit.

In at least one embodiment, the threshold segment table is edited by a terminal having an editing function, and downloaded to the second controller after being edited. In at least one embodiment, when the voltage value of the cell is lower, the charging adapter outputs the power signal with high current (for example, 4 A) for charging the cell. As the voltage value of the cell increases, the voltage value received by the second controller continuously jumps to a threshold segment with higher values from a threshold segment with lower values, and the second controller sends the current regulation instruction matched with the threshold segment with higher values to the regulation circuit according to the threshold segment table. The regulation circuit performs a current regulation according to the current regulation instruction, and outputs the power signal with lower current (for example, 3 A) for charging the cell. Accordingly, based on the threshold segment table, the current value of the power signal outputted by the regulation circuit is gradually reduced as the voltage value of the cell increases, thus reducing the charging time and avoiding overcharging the cell.

In at least one embodiment of the present disclosure, when the detected voltage value of the cell is in a range from 0V to 4.3V, the charging adapter outputs the power signal with 4 A for charging the cell; when the detected voltage value of the cell is in a range from 4.3V to 4.32 V, the charging adapter outputs the power signal with 3 A for charging the cell; when the detected voltage value of the cell is in a range from 4.32V to 4.35V, the charging adapter outputs the power signal with 2 A for charging the cell; when the detected voltage value of the cell exceeds 4.35V, the charging adapter outputs the power signal with just hundreds of milliamps for charging the cell. Thus, by monitoring the voltage of the cell in real time, the charging adapter outputs high current (charging current with larger than 3 A) to the cell for performing the high-current charging on the cell, when the voltage of the cell is lower. Further, when the voltage of the cell reaches a turn-off voltage threshold (i.e., when the cell is to be fully charged), the charging adapter outputs low current (charging current with hundreds of milliamps) to the cell for performing the low-current charging on the cell. In this way, not only overcharging the cell is avoided, the charging time is also reduced.

In another embodiment of the present disclosure, since additional impedances such as an internal resistance, a parasitic resistance and a coupling resistance will be introduced into the charging loop (including the charging circuit in the mobile terminal and the charging circuit in the charging adapter), and these impedances will consume part of current (this part of current will not flow into the cell of the mobile terminal), the current value specified by the current regulation instruction will be larger than the current value of the power signal input into the cell (considering the part of current consumed by the introduced impedances), so as to ensure that the current value flowing into the cell reaches the preset current value. In at least one embodiment, the current value specified by the current regulation instruction equals to a sum of the preset current value flowing into the cell and the current value of the part of current consumed by the introduced impedances. For example, if the desired current value of the power signal flowing into the cell is 3.2 A, and the current value of the part of current consumed by the introduced impedances is 0.8 A, then the current value specified by the current regulation instruction (i.e., the current value of the power signal outputted from the charging adapter) is set to 4 A.

In an embodiment of the present disclosure, before step S1, the second controller sends a quick-charging request to the first controller. The first controller responds to the quick-charging request of the second controller, and feeds back a quick-charging permission instruction to the second controller. The second controller sends a notification request for obtaining the voltage value of the cell to the first controller, via which the first controller is instructed to feed back the voltage value of the cell to the second controller in real time.

Specifically, in the present embodiment, if a conventional charging adapter is used to charge the cell of the mobile terminal, the conventional charging adapter does not have the second controller, and thus will not send the quick-charging request to the first controller for asking whether there is a quick-charging need. However, in embodiments of the present disclosure, the charging adapter is provided with the second controller, and the mobile terminal is provided with the first controller, such that the whole charging process can be monitored in real time through the communication between the first controller and the second controller.

Further, if the charging adapter has the capability of outputting high current, the first controller and the second controller will perform communication as to whether there is a quick-charging need. Specifically, the second controller sends the quick-charging request to the first controller, for asking the first controller whether to accept the high-current charging of the charging adapter on the cell of the mobile terminal. If it is allowed to perform the high-current charging on the cell of the mobile terminal, the first controller sends the quick-charging permission instruction to the second controller, and then the second controller determines that the high-current charging for the cell of the mobile can be performed after receiving the quick-charging permission instruction.

Further, the second controller sends the notification request to the first controller, and asks the first controller about the voltage value of the cell via the notification request. During the whole charging process, the cell connector coupled to the cell always obtains the voltage value of the cell in real time, and sends the obtained voltage value of the cell to the first controller in real time. Once the first controller receives the notification request, the first controller sends the voltage value of the cell to the second controller in response to the notification request.

In another embodiment of the present disclosure, the charging adapter further includes a current and voltage detection circuit.

Moreover, the second controller sends the second switch-off instruction to the first controller and the second switch circuit respectively if the second abnormal charging information is detected as follows.

The second controller obtains a current value and a voltage value of the power signal after the current regulation via the current and voltage detection circuit, and sends the second switch-off instruction to the first controller and the second switch circuit respectively if the current value of the power signal after the current regulation is greater than an overcurrent threshold and/or if the voltage value of the power signal after the current regulation is greater than an overvoltage threshold.

In the present embodiment, the current and voltage detection circuit is connected in series between the regulation circuit and the second charging interface of the charging adapter, and the current value and the voltage value of the power signal outputted from the regulation circuit (the power signal after the current regulation) can be detected in real time via the current and voltage detection circuit. Meanwhile, the second controller receives the detected current value and voltage value in real time.

Then, the second controller determines whether the obtained current value is larger than the overcurrent threshold (set according to the charging requirements of the charging adapter and the mobile terminal) and whether the obtained voltage value is larger than the overvoltage threshold (set according to the charging requirements of the charging adapter and the mobile terminal), and sends the second switch-off instruction to the first controller and the second switch circuit respectively if the obtained current value (the current value of the power signal after the current regulation) is larger than the overcurrent threshold and/or if the obtained voltage value (the voltage value of the power signal after the current regulation) is larger than the overvoltage threshold.

Further, the second switch circuit is switched off, and the charging adapter is prevented from charging the cell of the mobile terminal. Meanwhile, the first controller can also decide whether there is a need to execute corresponding operations, such as controlling the first switch circuit to switch off for stopping charging the cell via the first switch circuit, according to the received second switch-off instruction.

Figure 2:
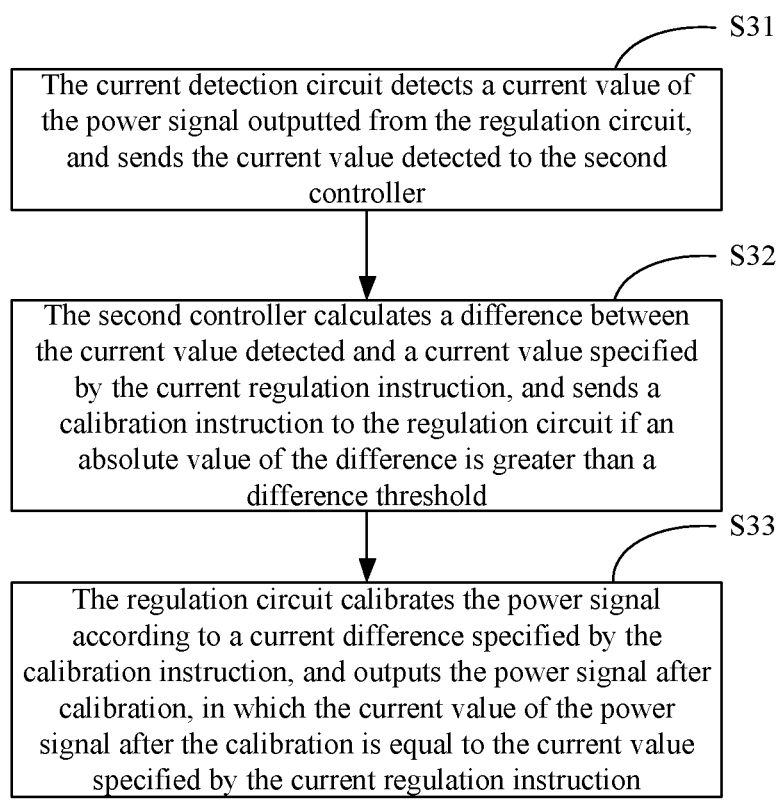
FIG. 2 is a flow chart of step S3 in a quick-charging control method according to an embodiment of the present disclosure.

FIG. 2 illustrates a specific flow chart of step S3 in the quick-charging control method provided by embodiments of the present disclosure. For illustration purposes, only the parts related to embodiments of the present disclosure are shown, which will be described in detail in the following.

In another embodiment of the present disclosure, in order to ensure that the power signal outputted from the regulation circuit has a high current (the high current has the current value specified by the current regulation instruction), there is a need to monitor in real time whether the power signal outputted from the charging adapter has the current value specified by the current regulation instruction. Thus, the regulation circuit includes a current detection circuit.

Moreover, the regulation circuit performs the current regulation according to the current regulation instruction and outputs the power signal after the current regulation as follows.

In step S31, the current detection circuit detects a current value of the power signal outputted from the regulation circuit, and sends the detected current value to the second controller.

In step S32, the second controller calculates a difference between the detected current value and the current value specified by the current regulation instruction, and send a calibration instruction to the regulation circuit if an absolute value of the calculated difference is larger than a difference threshold.

In step S33, the regulation circuit calibrates the power signal according to the current difference specified by the calibration instruction, outputs the power signal after the calibration, in which the current value of the power signal after the calibration is equal to the current value specified by the current regulation instruction.

In the present embodiment, the regulation circuit has the current detection circuit, via which the current value of the power signal outputted by the regulation circuit (i.e., the current value of the power signal outputted by the charging adapter) can be detected in real time. In at least one embodiment, the current detection circuit has a current detection resistor, via which the current value of the power signal outputted by the regulation circuit is detected in real time and converted to the voltage value, which is sent to the second controller. Then, the second controller determines the current value of the power signal outputted by the regulation circuit according to the received voltage value and the resistance of the current detection resistor.

Further, the second controller calculates the difference between the detected current value and the current value specified by the current regulation instruction, calculates the absolute value of the difference, and determines whether the absolute value is larger than the difference threshold. If the absolute value is larger than the difference threshold, the second controller feeds back the calibration instruction to the regulation circuit, such that the regulation circuit regulates the current value of the power signal outputted timely according to the calibration instruction. In at least one embodiment, the difference threshold can be pre-adjusted according to the actual working environment of the regulation circuit.

Further, if the regulation circuit receives the calibration instruction, it indicates that the current value of the power signal outputted by the regulation circuit has a higher deviation from the current value specified by the current regulation instruction, and the regulation circuit needs to perform the current regulation again, specifically, performs the current regulation according to the current difference specified by the calibration instruction, for ensuring that the current value of the power signal outputted by the regulation circuit is equal to the current value specified by the current regulation instruction.

In a specific embodiment of the present disclosure, the regulation circuit further includes a voltage and current regulation circuit, which obtains the original power signal after performing the rectification and filter on the commercial power. In order to calibrate the power signal outputted by the regulation circuit according to the calibration instruction, the regulation circuit will determine a voltage regulation instruction according to the current difference specified by the calibration instruction during regulating the voltage of the original power signal, and sends the voltage regulation instruction to the voltage and current regulation circuit. The voltage and current regulation circuit performs the voltage regulation according to the voltage regulation instruction, and outputs the power signal after the voltage regulation. Since the power signal after the voltage regulation will flow through the current detection resistor, it is possible to re-detect by the current detection resistor whether the current value of the power signal after the voltage regulation is equal to the current value specified by the current regulation instruction. When the current value of the power signal flowing through the current detection resistor (the power signal after the voltage regulation) is equal to the current value specified by the current regulation instruction, the regulation circuit stops determining the voltage regulation instruction according to the received calibration instruction, and the voltage and current regulation circuit stops performing the voltage regulation.

Thus, in order to ensure in real time that the current value of the power signal outputted by the regulation circuit is equal to the current value specified by the current regulation instruction, a real-time detection is performed by the current detection circuit, and if the current is too high or too low, the current value is fed back to the second controller. The second controller generates the calibration instruction according to the feedback current value and sends the calibration instruction to the regulation circuit. The regulation circuit determines the voltage regulation instruction according to the calibration instruction and sends the voltage regulation instruction to the voltage and current regulation circuit. Further, the voltage and current regulation circuit performs the voltage regulation according to the voltage regulation instruction, and outputs the power signal after the voltage regulation. Then, whether the current value of the power signal after the voltage regulation is equal to the current signal specified by the current regulation instruction is detected again by the current detection resistor.

Figure 3:
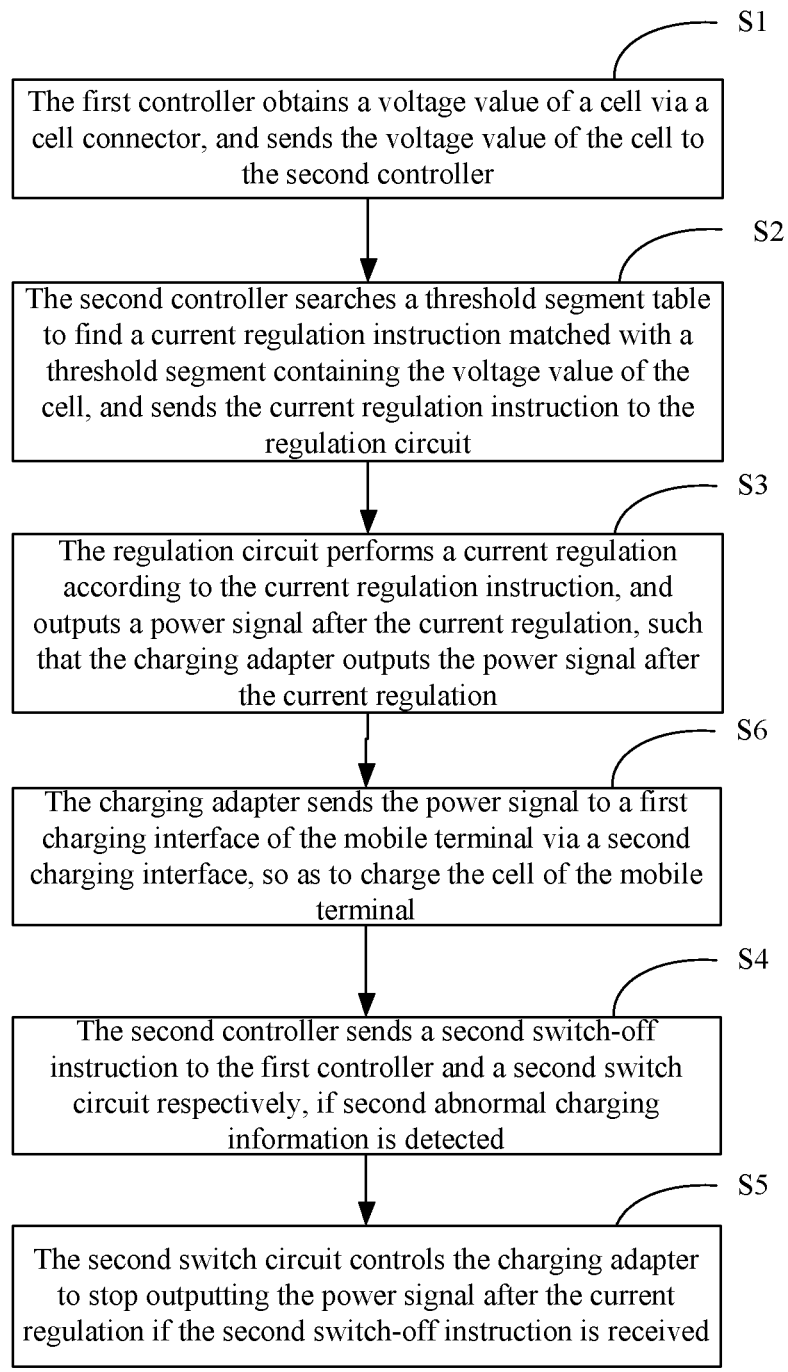
FIG. 3 is a second flow chart of a quick-charging control method according to an embodiment of the present disclosure.

FIG. 3 is a second flow chart of a quick-charging control method according to an embodiment of the present disclosure. For illustration purposes, only the parts related to embodiments of the present disclosure are shown, which will be described in detail in the following.

In another embodiment of the present disclosure, after the regulation circuit performs the current regulation and outputs the power signal after the current regulation, the quick-charging control method further includes following steps.

In step S6, the charging adaptor sends the power signal to a first charging interface of the mobile terminal via a second charging interface, such that the charging adapter charges the cell of the mobile terminal, in which the first power wires of the first charging interface is coupled to the second power wires of the second charging interface, the first ground wires of the first charging interface is coupled to the second ground wires of the second charging interface, and there are P first power wires, Q first ground wires, where P is greater than or equal to 2, and Q is greater than or equal to 2.

In the present embodiment, the existing MICRO USB interface (including the MICRO USB plug of the charging adapter and the MICRO USB socket of the mobile terminal) merely includes one power wire and one ground wire, such that the charging loop can be formed only by the power wire and the ground wire, and thus the charging current is generally hundreds of milliamps and generally less than 3 A.

For this, the present embodiment provides the first charging interface capable of supporting the high-current charging (the charging current above 3 A). Since the first charging interface has at least two first power wires and at least two first ground wires, the mobile terminal can support the high-current charging when being charged via the first charging interface.

In addition, if the charging adapter plugged with the first charging interface is the conventional charging adapter (for example, the charging adapter which uses the existing MICRO USB interface to charge), only the conventional charging can be performed (the only one power wire of the MICRO USB interface is plugged with the one first power wire of the first charging interface, the only one ground wire of the MICRO USB interface is plugged with the one first ground wire of the first charging interface, and the cell is charged using the only one power wire and the only one ground wire).

In at least one embodiment, there are P second power wires, and Q second ground wires.

The P first power wires of the first charging interface are coupled to the P second power wires of the second charging interface correspondingly, and the Q first ground wires of the first charging interface are coupled to the Q second ground wires of the second charging interface correspondingly.

In the present embodiment, when the first charging interface is coupled to the second charging interface, at least two charging loops can be formed (the number of the charging loops is the minimum value of P and Q). Thus, by coupling the first charging interface with the second charging interface, the high-current charging (the charging current above 3 A) can be supported. Further, the charging adapter can output the power signal with high current (e.g. the power signal of 4 A) when the voltage value of the cell is lower (for example, the voltage value of the cell is lower than 4.3V), so as to charge the cell of the mobile terminal with the high-current.

In at least one embodiment, the power wire and the ground wire of the existing MICRO USB interface are made of metal copper foil whose electric conductivity is less than 20%, but the first power wires and the first ground wires included in the first charging interface provided by the present embodiment and the second power wires and the second ground wires included in the second charging interface provided by the present embodiment are made of phosphor bronze C7025 whose electric conductivity reaches 50%. Thus, the charging current can be further enhanced base on the case that at least two charging loops (including at least two first power wires, at least first ground wires, at least two second power wires and at least two ground wires) are used to charge. In at least one embodiment, the first power wires and the first ground wires included in the first charging interface provided by the present embodiment and the second power wires and the second ground wires included in the second charging interface provided by the present embodiment are made of chromium bronze C18400 whose electric conductivity reaches 70%, which can further enhance the charging current.

In another embodiment of the present disclosure, the mobile terminal further includes a first switch circuit, which is controlled to switch on or off by the first controller. Thus, in the present embodiment, the first switch circuit is added in the mobile terminal based on the existing charging circuit in the mobile terminal. When the second charging interface is coupled to the first charging interface, the cell can be charged via the existing charging circuit in the mobile terminal, and the first controller can also control the first switch circuit to switch on, such that the charging adapter can charge the cell via the existing circuit as well as via the switched-on first switch circuit.

As at least one embodiment of the present disclosure, when the first controller receives the quick-charging request sent by the second controller and the first controller detects that there is a first switch circuit, it indicates that the cell can be charged via the existing charging circuit in the mobile terminal as well as via the first switch circuit, thus realizing charging the cell with high current.

Further, the first controller feeds back the quick-charging permission instruction to the second controller, i.e., notifies the second controller that it is possible to charge the cell with high current. Meanwhile, the first controller sends the switch-on instruction to the first switch circuit.

When the first switch circuit receives the switch-on instruction, the first switch circuit is switched on, and the charging adapter can also charge the cell via the switched-on first switch circuit when charging the cell via the existing charging circuit in the mobile terminal.

Figure 4:
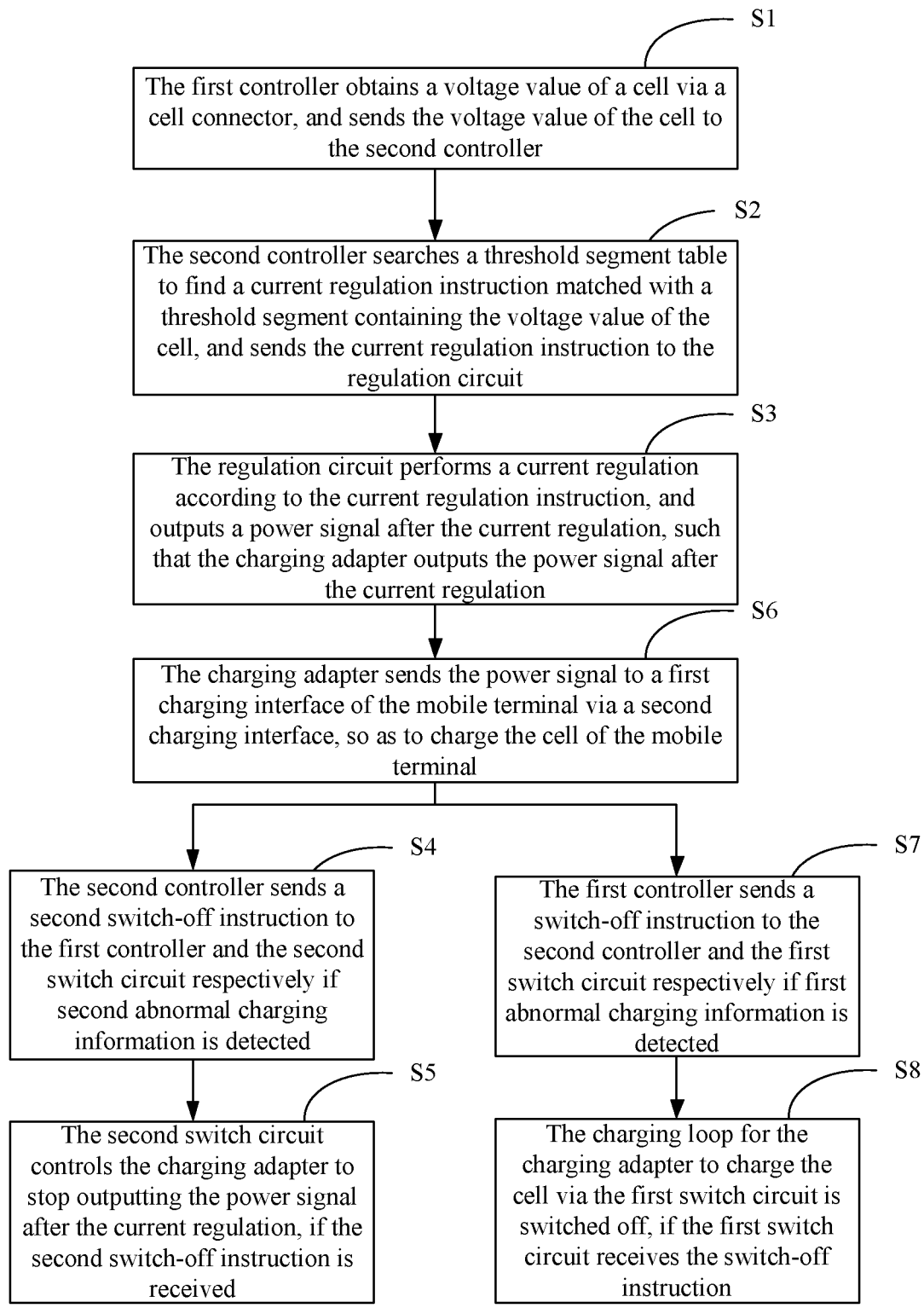
FIG. 4 is a third flow chart of a quick-charging control method according to an embodiment of the present disclosure.

FIG. 4 illustrates a third flow chart of a quick-charging control method according to an embodiment of the present disclosure. For illustration purposes, only the parts related to embodiments of the present disclosure are shown, which will be described in detail in the following.

In another embodiment of the present disclosure, the quick-charging control method can include following steps.

In step S7, the first controller sends a switch-off instruction to the second controller and the first switch circuit respectively if first abnormal charging information is detected, in which the first abnormal charging information includes an anode contact signal generated when an anode of the cell is not in good contact, a cathode contact signal generated when a cathode of the cell is not in good contact, and a temperature signal generated when a temperature of the cell is higher than a temperature threshold.

In step S8, if the first switch circuit receives the switch-off instruction, the charging loop for the charging adapter to charge the cell via the first switch circuit is switched off.

In the present embodiment, the first controller receives the charging information in real time and analyzes whether the received charging information is the first abnormal charging information. In at least one embodiment, the charging information is received via the cell connector. For example, the cell connector generates the anode contact signal when detecting whether the anode of the cell is in contact, generates the cathode contact signal when detecting whether the cathode of the cell is in contact, and generates the temperature signal when detecting the temperature of the cell, and sends the charging information such as the anode contact signal, the cathode contact signal and the temperature signal to the first controller.

Further, if the first controller determines that the received charging information is the first abnormal charging information, the first controller sends the switch-off instruction to the first switch circuit. For example, the first controller determines that the first abnormal charging information is detected and sends the switch-off instruction to the first switch circuit, if determining that the anode charging contact is not in contact with the anode of the cell well according to the anode contact signal received, or if determining that the cathode charging contact is not in contact with the cathode of the cell well according to the cathode contact signal received, or if determining that the temperature of the cell exceeds the temperature threshold according to the temperature signal. Further, the first switch circuit is switched off, so as to stop charging the mobile terminal via the first switch circuit.

If the first controller determines that the received charging information is the first abnormal charging information, the first controller also sends the switch-off instruction to the second controller while sending the switch-off instruction to the first switch circuit. The second controller can execute corresponding operations according to the received switch-off instruction, for example, can control the second switch circuit to switch off for preventing the charging adapter from sending the power signal to the mobile terminal.

As at least one embodiment of the present disclosure, the first controller determines whether the obtained voltage value of the cell is greater than the turn-off voltage threshold, and sends the switch-off instruction to the first switch circuit if the obtained voltage value of the cell is greater than the turn-off voltage threshold. When the first switch circuit receives the switch-off instruction, the charging loop for the charging adapter to charge the cell via the first switch circuit is switched off.

Specifically, during the whole charging process for the cell, the cell connector always obtains the voltage value of the cell in real time, and sends the voltage value of the cell to the first controller. When the cell is charged via the first switch circuit, the first controller determines whether the obtained voltage value of the cell is greater than the turn-off voltage threshold in real time. If the obtained voltage value of the cell is greater than the turn-off voltage threshold, the first controller sends the switch-off instruction to the first switch circuit. When the first switch circuit receives the switch-off instruction, the first switch circuit is switched off. Further, the charging adapter can charge the cell of the mobile merely via the existing charging circuit in the mobile terminal, but can not charge the cell via the switched-off first switch circuit.

In at least one embodiment, when the obtained voltage value of the cell is greater than the turn-off voltage threshold, the second controller can also send the current regulation instruction to the regulation circuit, and the power signal with lower current (for example, hundreds of milliamps) outputted by the regulation circuit is specified by the current regulation instruction.

In an embodiment of the present disclosure, the first controller can be a controller existing in the mobile terminal.

In another embodiment of the present disclosure, the mobile terminal not only has a third controller (already existed in the mobile terminal) used for handling applications, but also has the first controller which controls the first switch circuit and controls charging the cell of the mobile terminal.

Further, the first controller can forward the voltage value of the cell received in real time to the third controller, and the third controller determines whether the obtained voltage value of the cell is greater than the turn-off voltage threshold. If the obtained voltage value of the cell is greater than the turn-off voltage threshold, the third controller sends a first switch-off instruction to the first controller, and then the first controller sends the switch-off instruction to the first switch circuit. In at least one embodiment, if the obtained voltage value of the cell is greater than the turn-off voltage threshold, the third controller directly sends the switch-off instruction to the first switch circuit. When the first switch circuit receives the switch-off instruction, the charging loop for the charging adapter to charge the cell via the first switch circuit is switched off.

In at least one embodiment of the present disclosure, the first controller receives the charging information (including the anode contact signal, the cathode contact signal and the temperature signal) sent by the cell connector in real time, and forwards the charging information to the third controller.

Further, the third controller determines whether the charging information received is the first abnormal charging information, for example, determines whether the anode charging contact of the first switch circuit and the charging circuit in the mobile terminal is in good contact with the anode of the cell well according to the anode contact signal, determines whether the cathode charging contact of the first switch circuit and the charging circuit in the mobile terminal is in good contact with the cathode of the cell according to the cathode contact signal, and determines whether the temperature of the cell exceeds the temperature threshold according to the temperature signal.

Further, if the third controller determines that the charging information received is the first abnormal charging information, the third controller sends the switch-off instruction to the first switch circuit and the second controller, such that the first switch circuit is switched off, and the charging adapter is prevented from charging the cell via the first switch circuit. For example, if it is determined that the anode charging contact is not in good contact with the anode of the cell according to the anode contact signal, or if it is determined that the cathode charging contact is not in good contact with the cathode of the cell according to the cathode contact signal, or if it is determined that the temperature of the cell exceeds the temperature threshold according to the temperature signal, the charging information received is determined as the first abnormal charging information.

In at least one embodiment of the present disclosure, when the MICRO USB interface of the existing charging adapter is coupled to the first charging interface of the mobile terminal, the charging is performed via the existing charging circuit in the mobile terminal. Based on the existing charging circuit in the mobile terminal, the mobile terminal of the present embodiment is also added with a first switch circuit. Further, when the second charging interface is coupled to the first charging interface, not only the charging is performed via the existing charging circuit in the mobile terminal, but also the first controller controls the first switch circuit to switch on, such that the charging adapter can charge the cell via the switched-on first switch circuit while charging the cell via the existing charging circuit. Thus, when the second charging interface is coupled to the first charging interface, the first controller controls to charge the cell via the existing charging circuit in the mobile terminal and/or via the first switch circuit in the mobile terminal according to charging requirements.

Figure 5:
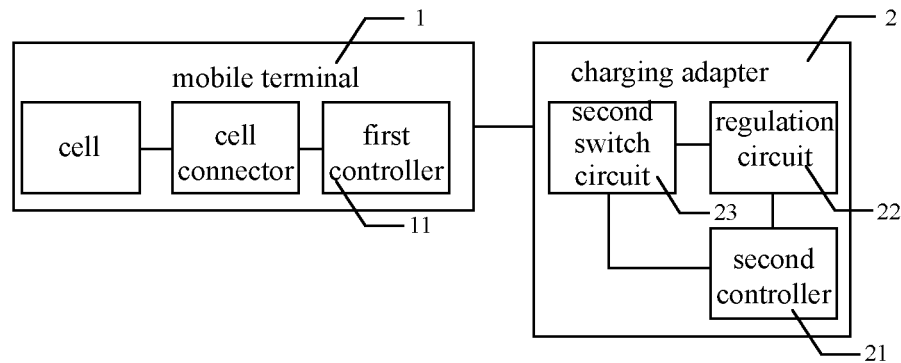
FIG. 5 is a first block diagram of a quick-charging control system according to embodiment of the present disclosure.

FIG. 5 illustrates a first structure of a quick-charging control system according to an embodiment of the present disclosure. For illustration purposes, only the parts related to embodiments of the present disclosure is provided, which will be described in detail in the following.

In at least one embodiment, the quick-charging control system provided by embodiments of the present disclosure can use the quick-charging control method provided by embodiments of the present disclosure, and the quick-charging control method provided by embodiments of the present disclosure can be applied to the quick-control system provided by embodiments of the present disclosure.

Embodiments of the present disclosure provide a quick-charging control system, and the quick-charging control system includes a charging adapter 2 including a second controller 21, a regulation circuit 22 and a second switch circuit 23 and a mobile terminal 1 including a cell connector, a first controller 11 and a cell.

The first controller 11 is configured to obtain a voltage value of the cell via the cell connector, and sends the voltage value of the cell obtained to the second controller 21.

The second controller 21 is configured to search a threshold segment table to find a current regulation instruction matched with a threshold segment containing the voltage value of the cell, to send the current regulation instruction to the regulation circuit 22, and to send a second switch-off instruction to the first controller 11 and the second switch circuit 23 respectively if second abnormal charging information is detected.

The regulation circuit 22 is configured to perform a current regulation according to the current regulation instruction, and to output a power signal after the current regulation, such that the charging adapter 2 outputs the power signal after the current regulation.

The second switch circuit 23 is configured to control the charging adapter 2 to stop outputting the power signal after the current regulation if the second switch-off instruction is received.

Figure 6:
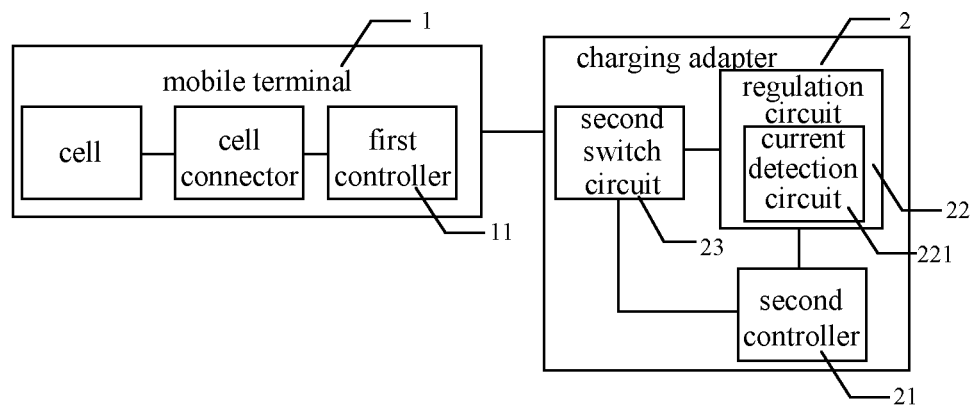
FIG. 6 is a second block diagram of a quick-charging control system according to an embodiment of the present disclosure.

FIG. 6 illustrates a second structure of a quick-charging control system according to an embodiment of the present disclosure. For illustration purposes, only parts related to embodiments of the present disclosure are shown, which will be described in detail in the following.

In another embodiment of the present disclosure, the regulation circuit 22 includes a current detection circuit 221.

The current detection circuit 221 is configured to detect a current value of the power signal outputted by the regulation circuit 22 and to sends the current value detected to the second controller 21.

The second controller 21 is further configured to calculate a difference between the current value detected and the current value specified by the current regulation instruction, and to send a calibration instruction to the regulation circuit 22 if an absolute value of the difference calculated is greater than a difference threshold.

The regulation circuit 22 is further configured to calibrate the power signal according to the current difference specified by the calibration instruction, and to output the power signal after the calibration, in which the current value of the power signal after the calibration is equal to the current value specified by the current regulation instruction.

Figure 7:
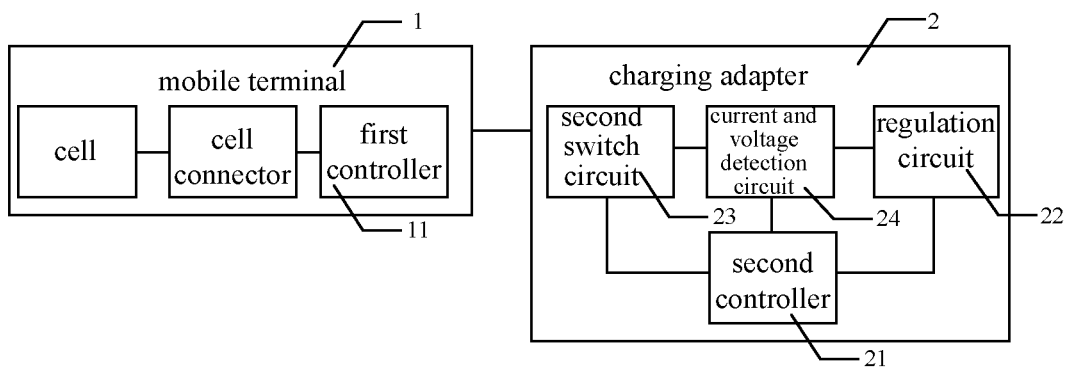
FIG. 7 is a third block diagram of a quick-charging control system according to an embodiment of the present disclosure.

FIG. 7 illustrates a third structure of a quick-charging control system according to an embodiment of the present disclosure. For illustration purposes, only parts related to embodiments of the present disclosure are shown, which will be described in detail in the following.

In another embodiment of the present disclosure, the charging adapter further includes a current and voltage detection circuit 24.

The second controller 21 is further configured to obtain a current value and a voltage value of the power signal after the current regulation via the current and voltage detection circuit 24, and to send a second switch-off instruction to the second switch circuit 23 if the current value of the power signal after the current regulation is higher than an overcurrent threshold and/or the voltage value of the power signal after the current regulation is higher than an overvoltage threshold.

In another embodiment of the present disclosure, the charging adapter 2 is further configured to send the power signal to the first charging interface of the mobile terminal 1 via the second charging interface, such that the charging adapter 2 charges the cell of the mobile terminal 1. There are P first power wires and Q first ground wires in the first charging interface, there are P second power wires and Q second ground wires in the second charging interface, the P first power wires are coupled to the P second power wires correspondingly, and the Q first ground wires are coupled to the Q second ground wires corresponding, where P is greater than or equal to 2, and Q is greater than or equal to 2.

Figure 8:
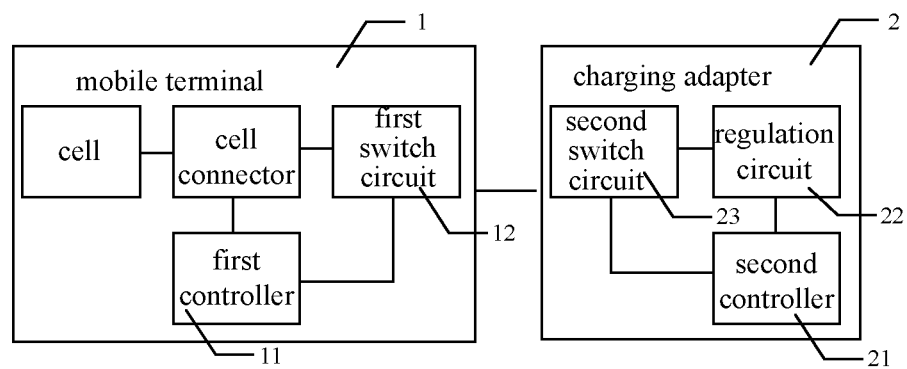
FIG. 8 is a fourth block diagram of a quick-charging control system according to an embodiment of the present disclosure.

FIG. 8 illustrates a fourth structure of a quick-charging control system according to an embodiment of the present disclosure. For illustration purposes, only parts related to embodiments of the present disclosure are shown, which will be described in detail in the following.

In another embodiment of the present disclosure, the mobile terminal 1 further includes a first switch circuit 12.

The first controller 11 is further configured to send a switch-off instruction to the second controller 21 and the first switch circuit 12 when first abnormal charging information is detected, in which the first abnormal charging information includes an anode contact signal generated when an anode of the cell is not in good contact, a cathode contact signal generated when a cathode of the cell is not in good contact, and a temperature signal generated when a temperature of the cell is greater than a temperature threshold.

The first switch circuit 12 is configured to switch off the charging loop for the charging adapter to charge the cell via the first switch circuit 12 if the switch-off instruction is received.

The foregoing description is further explanation for the present disclosure with reference to preferred embodiments, and cannot be used to limit the present disclosure. For those ordinary skilled in the art, equivalents, alternatives and obvious variants can be made without departing from the spirit of the present disclosure, can have same functions or usages, and can belong to the protection scope determined by the claims submitted in the present disclosure.

What is claimed is:

1. A charging control method, applicable to a charging device and comprising:
   sending a quick-charging request to a device to be charged to ask the device to be charged whether to accept a high-current charging of the charging device on a cell of the device to be charged;
   receiving a quick-charging permission instruction sent by the device to be charged and performing high-current charging on the cell of the device to be charged;
   sending a notification request to the device to be charged, wherein the notification request is configured to notify the device to be charged of sending the voltage value of the cell in real time;
   obtaining a voltage value of the cell of the device to be charged;
   searching a threshold segment table to find a current regulation instruction matched with a threshold segment containing the voltage value of the cell;
   performing current regulation on a first power signal to be outputted by the charging device based on the current regulation instruction to acquire a second power signal; and
   outputting the second power signal to the device to be charged.

2. The method of claim 1, wherein the threshold segment table records one or more threshold segments and current regulation instructions having a mapping relation with the threshold segments.

3. The method of claim 1, further comprising:
   detecting a current value of the second power signal;
   when an absolute value of a difference between the current value detected and a current value specified by the current regulation instruction is greater than a difference threshold, calibrating the second power signal; and
   outputting the second power signal after calibration, wherein a current value of the second power signal after calibration is equal to the current value specified by the current regulation instruction.

4. The method of claim 1, further comprising:
   detecting abnormal charging information; and
   closing an output of the charging device in response to detecting the abnormal charging information.

5. The method of claim 4, wherein the abnormal charging information comprises at least one of information indicating that a temperature value of the charging device is higher than a first temperature threshold, information indicating that the charging device has been pulled out, information indicating that a current value of the second power signal is greater than a current threshold, and information indicating that a voltage value of the second power signal is greater than a voltage threshold.

6. The method of claim 1, further comprising:
   receiving abnormal charging information sent by the device to be charged; and
   closing an output of the charging device in response to receiving the abnormal charging information sent by the device to be charged, wherein the abnormal charging information sent by the device to be charged comprises at least one of an anode contact signal generated when an anode of the cell is not in good contact, a cathode contact signal generated when a cathode of the cell is not in good contact, and a temperature signal generated when a temperature of the cell is higher than a second temperature threshold.

7. The method of claim 1, further comprising:
   sending the second power signal to a first charging interface of the device to be charged via a second charging interface of the charging device, such that the charging device charges the cell of the device to be charged, wherein the first charging interface comprises P first power wires and Q first ground wires, the second charging interface comprises P second power wires and Q second ground wires, the P first power wires are coupled to the P second power wires correspondingly, the Q first ground wires are coupled to the Q second ground wires correspondingly, P is greater than or equal to 2, and Q is greater than or equal to 2.

8. The method of claim 7, wherein the first charging interface further comprises at least two first data wires, and the second charging interface further comprises at least two second data wires,
obtaining the voltage value of the cell of the device to be charged, comprises:
obtaining the voltage value of the cell of the device to be charged via the at least two first data wires and the at least two second data wires.

9. A charging device, comprising:
a controller, configured to send a quick-charging request to a device to be charged to ask the device to be charged whether to accept a high-current charging of the charging device on a cell of the device to be charged, and receive a quick-charging permission instruction sent by the device to be charged; send a notification request to the device to be charged, wherein the notification request is configured to notify the device to be charged of sending the voltage value of the cell in real time; obtain a voltage value of the cell of the device to be charged, and search a threshold segment table to find a current regulation instruction matched with a threshold segment containing the voltage value of the cell; and
a regulation circuitry, configured to perform current regulation on a first power signal to be outputted by the charging device based on the current regulation instruction to acquire a second power signal, and output the second power signal to the device to be charged.

10. The device of claim 9, wherein the threshold segment table records one or more threshold segments and current regulation instructions having a mapping relation with the threshold segments.

11. The device of claim 9, further comprising:
a current detection circuitry, configured to detect a current value of the second power signal;
a calibrating circuitry, configured to, when an absolute value of a difference between the current value detected and a current value specified by the current regulation instruction is greater than a difference threshold, calibrate the second power signal, and output the second power signal after calibration, wherein a current value of the second power signal after calibration is equal to the current value specified by the current regulation instruction.

12. The device of claim 9, further comprising:
an abnormal detection circuitry, configured to detect abnormal charging information; and
a first switch circuitry, configured to close an output of the charging device in response to detecting the abnormal charging information.

13. The device of claim 12, wherein the abnormal charging information comprises at least one of information indicating that a temperature value of the charging device is higher than a first temperature threshold, information indicating that the charging device has been pulled out, information indicating that a current value of the second power signal is greater than a current threshold, and information indicating that a voltage value of the second power signal is greater than a voltage threshold.

14. The device of claim 9, wherein the controller is further configured to receive abnormal charging information sent by the device to be charged; and the device further comprises a second switch circuitry, configured to close an output of the charging device in response to receiving the abnormal charging information sent by the device to be charged, wherein the abnormal charging information sent by the device to be charged comprises at least one of an anode contact signal generated when an anode of the cell is not in good contact, a cathode contact signal generated when a cathode of the cell is not in good contact, and a temperature signal generated when a temperature of the cell is higher than a second temperature threshold.

15. The device of claim 9, further comprising:
a second charging interface, configured to send the second power signal to a first charging interface of the device to be charged, such that the charging device charges the cell of the device to be charged, wherein the first charging interface comprises P first power wires and Q first ground wires, the second charging interface comprises P second power wires and Q second ground wires, the P first power wires are coupled to the P second power wires correspondingly, the Q first ground wires are coupled to the Q second ground wires correspondingly, P is greater than or equal to 2, and Q is greater than or equal to 2.

16. The device of claim 15, wherein the first charging interface further comprises at least two first data wires, and the second charging interface further comprises at least two second data wires,
the at least two second data wires are configured to obtain the voltage value of the cell of the device to be charged via the at least two first data wires and send the voltage value of the cell to the controller.

* * * * *